(12) United States Patent
McProud et al.

(10) Patent No.: US 8,225,548 B2
(45) Date of Patent: Jul. 24, 2012

(54) HILL PLOT FARMING METHOD FOR CEREAL GRAINS

(76) Inventors: Wayne L. McProud, Moscow, ID (US); Gene Elbert McProud, Moscow, ID (US); Wayne L. McProud, legal representative, Moscow, ID (US)

( * ) Notice: Subject to any disclaimer, the term of this patent is extended or adjusted under 35 U.S.C. 154(b) by 176 days.

(21) Appl. No.: 12/337,270

(22) Filed: Dec. 17, 2008

(65) Prior Publication Data

US 2010/0146853 A1   Jun. 17, 2010

(51) Int. Cl.
*A01C 1/00* (2006.01)
*A01G 7/00* (2006.01)
*A01H 4/00* (2006.01)

(52) U.S. Cl. .................................. 47/58.1 SE
(58) Field of Classification Search ............. 47/58.1 SE, 47/1.01 T, 1.43, DIG. 1
See application file for complete search history.

(56) References Cited

U.S. PATENT DOCUMENTS

| | | | |
|---|---|---|---|
| 281,677 A | 7/1883 | Evinger | |
| 529,492 A | 11/1894 | Hill et al. | |
| 654,548 A | 7/1900 | Latisniere | |
| 1,340,654 A | 5/1920 | Griswold et al. | |
| 1,914,915 A | 6/1932 | Handler | |
| 2,146,222 A | 8/1937 | Pace | |
| 3,968,933 A | 7/1976 | Waldrum | |
| 4,083,315 A | 4/1978 | Crabbs | |
| 4,164,190 A | 8/1979 | Newman | |
| 4,779,776 A | 10/1988 | Erazo et al. | |
| 5,723,596 A * | 3/1998 | Cramer et al. | 536/24.3 |
| 6,173,664 B1 | 1/2001 | Heimbuch | |
| 6,689,609 B1 | 2/2004 | Fan et al. | |
| 6,722,297 B1 | 4/2004 | Nelson, Jr. | |
| 7,207,140 B1 | 4/2007 | Decker | |

OTHER PUBLICATIONS

Wallace, D.H. & Yan, W. Plant Breeding and Whole-System Crop Physiology. Improving Crop Maturity, Adaptation and Yield: 1998, CAB International, ISBN 0-85199-265-X. See sections 10.1, 10.3.1, 10.4.1, 12.3.4; fig. 12.1.*
Walsh, E.J. et al., "Hill Plots for Preliminary Yield Evaluation of Double Haploids in a Barley Breeding Program" Crop Science, 1976, vol. 16, pp. 862-866. See p. 865, col. 2, paragraph 1; tables 1 & 2.*
Anonymous. "Seeding Rates," 2007-2008 Wheat Production Guide, pp. 15-18. Cooperative Extension Service, College of Agriculture and Environmental Science, Univ. of Georgia. Mar. 2008.
Shroyer, J.P., H. Kok and C.R. Thompson. "Planting Practices," Wheat Production Handbook, pp. 9-12. Kansas State Univ. Agricultural Experiment. 1997.
Stark, J.C. "Seeding Practices," Idaho Spring Barley Production Guide, pp. 15-16. College of Agricultural and Life Sciences, Univ. of Idaho. 2003.
Bonnett, O.T. and W.M. Bever. Head-hill Method of Planting Head Selections of Small Grains. Am. Soc Agron. J. 47:253-255, 1947.
Jellum, M.C., C.M. Brown and R.D. Seif. "Hill and Row Plot Comparison for Yield of Oats." Crop Sci. 3:194-196,1963.
Ross, W.M. and J.D. Miller. A Comparison of Hill and Conventional Yield Tests Using Oats and Spring Barley. Agron. J. 47:253-255,1955.

(Continued)

*Primary Examiner* — Andrea Valenti
(74) *Attorney, Agent, or Firm* — Scott D. Swanson; Dykas & Shaver, LLP

(57) ABSTRACT

The invention consists of a method of planting seeds of plants selected for enhanced colony growth attributes in a hill plot seeding method to produce an enhanced commercial yield of cereal grain as well as a method of producing seeds selected for enhanced colony growth attributes.

17 Claims, 1 Drawing Sheet

OTHER PUBLICATIONS

Torrie, J.H. "Comparison of Hills and Rows for Evaluating Soybean Strains," Crop Sci. 2:47-49, 1962.
Frey, K.J. "The Utility of Hill Plots in Oat Research." Euphytica 14:196-208. 1965.
Baker, R.J. and D. Leisle. "Comparison of Hill and Rod Row Plots in Common and Durum Wheats," Crop Sci. 10:581-583. 1970.
Falk, D.E., E. Reinbergs, B.S. Chhina and D.E. Mather. "Hill Plots for Yield Evaluation in a Doubled Haploid Recurrent Selection Program in Barley," Can. J. Plant Sci. 76:757-761. 1996.
Khadr, F.H., A.A.Kassem and A.A. Elkishen. "Hill Versus Row Plot for Testing Wheat Lines," Crop Sci. 10:449-450. 1970.
Novoselovic, D., G. Drezner, A. Lalic, S. Grljusic and J. Gunjaca. "Comparison of Diferent Planting Methods in Relation to Grain Yield of Wheat," Cereal Research Communications. 35:141-149. 2007.
Walsh, E.J., S.J. Park and E. Reinbergs. "Hill Plots for Preliminary Yield Evaluation of Doubled Haploids in a Barley Breeding Program," Crop Sci. 16:862-866. 1976.
Briggs, K.G., D.G. Faris. "Influence of Sample-Size on Relationship Between Yielding Ability of Space-planted and Solid-seeded Barley Cultivars," Can. J. Plant Sci. 58:263-266.
O'Brien, L., R.J. Baker and L.E. Evans. "Comparison of Hill and Row Plats for F3 Yield Testing," Can. J. Plant Sci. 59:1013-1017. 1979.
International Search Report for corresponding PCT Application No. PCT/US2009/068377, filed Dec. 17, 2009.
Ohji, T., "Traditional Rice Cultivation Methods and a Survey of Plows in Thailand: With Special Reference to the Development of Plow Technology" Southeast Asian Studies, 1995, vol. 33, No. 3, pp. 427-462. See p. 432, paragraph I-2-5.
Scarry, C.M., Crop Husbandry Practices in North America's Eastern Woodlands: Chapter 20, pp. 391-404. In: Case Studies in Environmental Archeology, 2008, Second Edition, Spring New York, ISBD 978-0-387-71302-1. <DOI: 10.1007/978-0-387-71308-8>. See p. 395, paragraph 2.
Baker, R. J. & Leisle D., "Comparison of Hill and Rod Row Plot in Common and Durum Wheats" Crop Science, 1970, vol. 10, pp. 581-583. See abstract; p. 583, col. 1, paragraph 4, table 2.
Bandaru, B.A. et al., "Growing Dryland Grain Sorghum in Clumps to Reduce Vegetative Growth and Increase Yield" Agronomy Journal, 2006, vol. 98, pp. 1109-1120. See p. 1110, col. 2, paragraph 3—p. 1113, col. 1, paragraph 3; fig. 1: tables 3-6.
Dahleen, L.S. et al., Agronomic Trait Variation in Oat Lines Derived from Tissue Culture: Crop Science, 1991, vol. 31, pp. 90-94. See p. 90, col. 2, paragraph 4-6; tables 1 & 2.
Novoselovic, D. et al., "Comparison of Different Planting Methods in Relation to Grain Yield of Wheat" Cereal Research Communications, 2007, vol. 35, No. 1, pp. 141-149. See p. 142, paragraph 405; table 1; table 3, methods 3&4.
Wallace, D.H. & Yan, W. Plant Breeding and Whole-System Crop Physiology. Improving Crop Maturity, Adaptation and Yield: 1998, CAB International, ISBN 0-85199-265-X. See sections 10.1, 10.3.1, 10.4.1; 12.3.4; fig. 12.1.

* cited by examiner

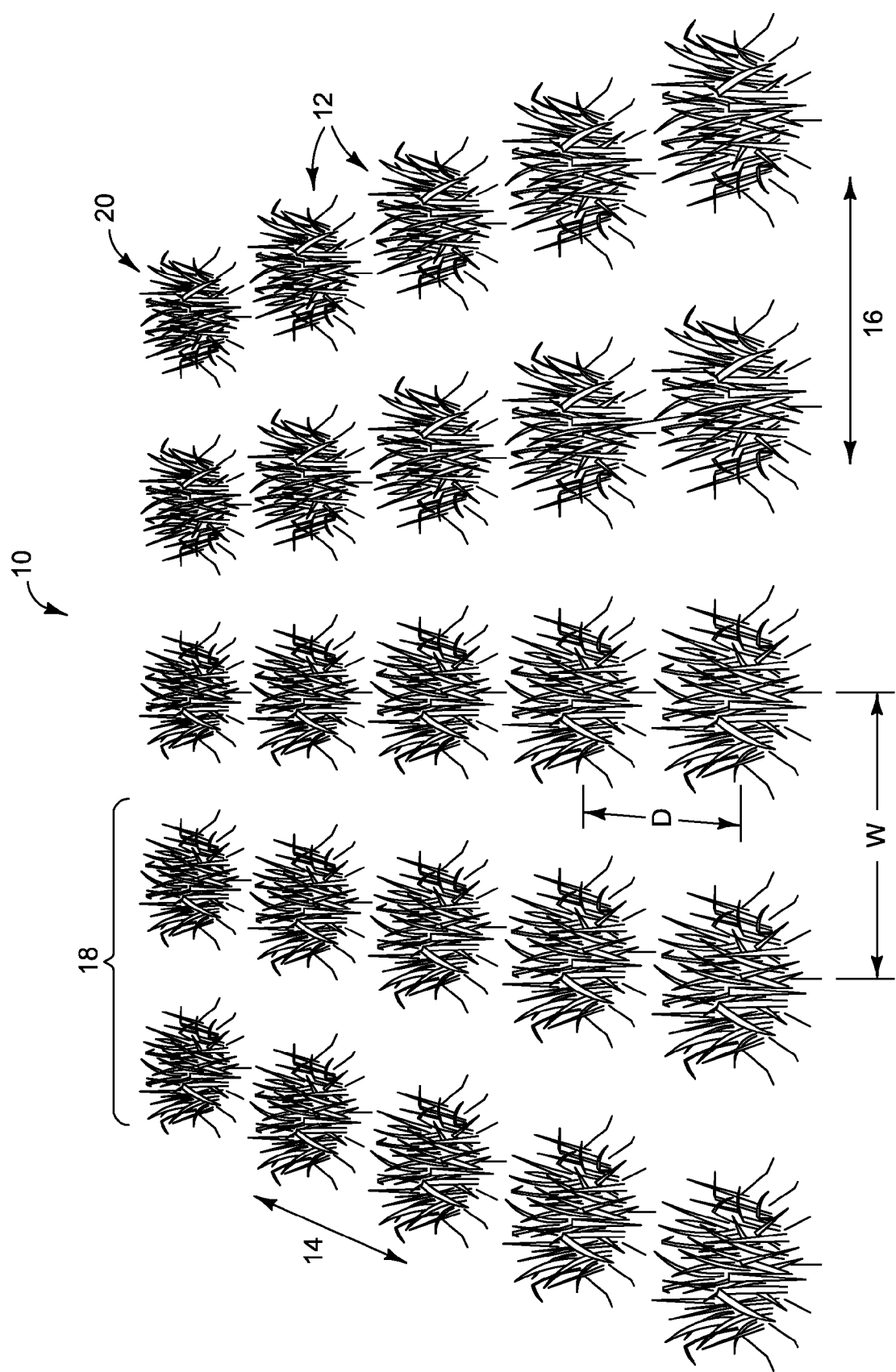

HILL PLOT FARMING METHOD FOR CEREAL GRAINS

FIELD OF THE INVENTION

The invention generally relates to a method for growing cereal grains specially selected for their colony growth attributes, and to a method of selecting for colony growth attributes in a cereal grain.

BACKGROUND OF THE INVENTION

Cereal grains provide an extremely important source of nourishment to people throughout the world. For example, in many countries in central Asia, the Middle East, and Northern Africa between 40 and 60 percent of all daily calories consumed by humans are from wheat. The United Nations has suggested that world wide cereal grain production needs to double within the next 50 years in order to sustain current human population growth projections. Accordingly, finding ways to enhance cereal grain production are extremely important in today's society. Numerous studies and publications also suggest the increased need for cereal grain production through out the world in the upcoming future.

The domestication of barley and of emmer and einkorn, both primitive wheats, occurred in northern Mesopotamia to include modern day northern Iraq, Syria and the Anatolian Plain of Turkey over the period of 9000 BC to 4500 BC. The cultural practice of that period was to hand scatter seed over a tilled field. The consequence of this hand broadcasting was to cause kernels to fall as separate seeds resulting in the wheat and barley plants competing in the field environments as individuals. Accordingly, seeds with the best genetic attributes for growth as individuals, as opposed to colony growth, emerged with reproductive advantages. Being more productive they were more likely to undergo natural hybridization with plants displaying similar advantages. Currently modern drills typically place single cereal seeds within a row at a spacing of about one kernel per inch. As was the case in the Neolithic Period, today's commercial fields typically grow cereal crops as individual plants.

As developed throughout history, conventional seeding practices for wheat and barley in the United States are to more or less evenly distribute seeds along a drill row or to scatter the seeds and then cover them through tillage. The volume of seed distributed along the row and the spacing of the rows vary by environment, variety and custom. Seeding rates vary from as low as 50 pounds of seed sown per acre to 150 pounds of seed sown per acre. Row spacing varies from 3 to 12 inches apart, depending on environment, variety and custom. In Georgia it is recommended "That each linear foot of row should contain 20-25 (wheat) seeds." In Kansas it is recommended that in the field wheat populations range from 600,000 to 1,080,000 plants per acre. In Idaho barley is normally seeded in rows. Occasionally barley is broadcast seeded using a fertilizer spreader followed by a tillage practice that covers the seed.

An alternative seeding method, which is not commercially practiced to any significant degree, is to plant hill plots. Hill plot culture involves planting multiple seeds in the same seed bed or hold or hill causing the crop to grow as a colony of plants in the field environment as opposed to the conventional practice of planting seeds singly so plants grow as individuals in the field environment.

In 1947 Bonnett and Dever proposed using hill plots to eliminate off-types in varietal purification programs and for selecting for disease resistant genotypes. Various researchers have used hill plots as a means of evaluating yield potential of newly selected experimental lines. A likely problem with this method is that the researchers have not used plants selected for attributes for increased yield when grown as a colony of plants. In use, some authors have reported that hill plots were of questionable value for yield evaluation. The major concern voiced by these authors was the greater yield variability in hill plots than was measured in rod row plots. Other authors found hill plots to be useful in yield evaluations, particularly when large populations were being tested and where seed volume of the lines to be tested was limited. Other authors were ambivalent as to the value of hill plots in yield evaluation. Although researchers have used hill plot planting methods for a variety of purposes, it is not known to recurrently select for plants that have superior growth attributes when grown as a colony of plants in a hill plot system and to utilize those plants in the system. Accordingly, previous planting methods and research have not utilized plants genetically selected for their improved colony growth attributes and subsequently used these plants for enhanced commercial yield of cereal grains.

In performing experiments regarding planting methods and genetically selecting plants for their growth characteristics, we have found that it appears there are at least two different gene pools in cereals for enhanced yield. One gene pool promotes yields when plants compete individually in the field environment. Because of extensive plant breeding efforts by numerous public and private cereal breeding programs, the genes in this yield enhancing pool have been extensively mined. A second gene pool promotes yields when plants compete as a colony or collective in the field environment. This second pool of yield enhancing genes has apparently not to date been extensively mined.

Accordingly, an object of the current invention is to select for and exploit plants exhibiting superior colony growth attributes in order to increase commercial yield in cereal grains.

SUMMARY OF THE INVENTION

We have developed cereal lines possessing enhanced colony growth attributes. These lines when planted in hill plot systems show significant yield increases when compared to top lines developed utilizing conventional seeding designs growing as individual plants in commercial field environments.

Recurrent selection is arguably the most powerful plant breeding tool available to cereal breeders. This technique is little used in wheat and barley development programs because of the time required to exploit recurrent selection's power. To fully utilize recurrent selection two or three cycles are required. As each cycle takes up to 10 years to complete, an entire professional life of 25-30 years is needed to fully exploit this system's plant breeding potential. For 30 years we tested experimental lines of barley, wheat and durum in a hill plot system utilizing a recurrent selection program for increased cereal yield in a hill plot environment. The initial recurrent selection cycle involved making numerous crosses, and then testing and selecting genetically stabilized lines for increased hill plot yield potential. The highest yielding lines from cycle one were intercrossed, stabilized, tested and selected for increased hill plot yield potential. Then highest hill plot yielding lines from cycle two were used to initiate the next recurrent selection cycle.

Within seven or eight years of testing our lines in the hill plot system two surprising results surfaced. First we found that very significant yield advantages were being made in the hill plot environment. Lines selected for their colony growth attributes within the hill plot system were substantially out yielding the control varieties grown in the hill plot design. The second unexpected result was that in conventionally planted systems hill plot derived wheat and barley varieties selected for their enhanced colony growth attributes were unable to express the full yield potential that was bred into these lines.

Subsequent testing indicated that yield enhancement within the collective or hill plot environment can be captured in commercial fields. Tests comparing yields obtained from best commercial production practices utilizing highest yielding varieties to yields obtained from hill plot developed varieties grown in hill plot designs show that the hill plot genetic-environmental interaction significantly out produces current best practices of conventional planting with varieties of cereal grains that exhibit superior rod row growth genetics. These hill plot yield increases are obtained without any additional inputs over those used in current commercial practices (to include add fertilizers or plant growth compounds) or without the use of 'GMO' or molecular genetics breeding techniques. Hill plot derived varieties and control varieties are comparable for quality levels, agronomic traits and disease reactions.

The purpose of the foregoing Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the invention of the application, which is measured by the claims, nor is it intended to be limiting as to the scope of the invention in any way.

BRIEF DESCRIPTION OF THE DRAWINGS

FIGURE one is an illustration of a hill plot planting design with cereal grain plants growing thereon.

DESCRIPTION OF THE PREFERRED EMBODIMENTS

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Conventional cereal seeding practices distribute seeds separately resulting in plants that compete in the field environment as individuals. In 1978 we started a plant breeding program in which experimental lines were tested in hill plots where 3 to 30 seeds were planted in the same hole or seed bed or hill. For 30 years we tested experimental lines of barley, wheat and durum in a hill plot system utilizing a recurrent selection breeding program for increased yield in a hill plot environment. This 30 years of selection within the hill plot environment developed wheat, barley and durum lines that have superior yield capacity when compared to wheat, barley and durum varieties developed in conventional seeding designs that promote the advantages of individual plant growth.

As shown in FIG. 1, a hill plot 10 is a planting design where multiple seeds (typically 3 to 30 seeds) are planted in the same seed bed, hole, or hill 12. The result of this planting arrangement is that cereal grain plants, including but not limited to wheat plants and barley plants, compete in the field environment as a colony or collective of individual plants 20. For an enhanced commercial yield of cereal grain, each hill or seed bed 12 is comprised of 20-30 individual plants growing as a colony of plants.

About 6 or 7 years into our breeding efforts a couple of unexplained anomalies appeared. First our yield advances in the hill plot environment far exceeded the yield advances that competing conventional plant breeding programs were achieving in a conventional environment. The second anomaly was the non transferability of yield from the hill plot environment to a conventional environment. The high yields that hill plot derived lines expressed in hill plot trials were not expressed under conventional seeding designs.

The loss of yield expression can be explained by a genetic environmental interaction. It appears there are at least two different gene pools in cereal grains for enhanced yield relating to how many of the plants are grown together and the spacing of each plant or plant colony. One gene pool apparently promotes yield when plants compete individually in the field environment. Because of extensive plant breeding efforts by numerous public and private cereal breeding programs, the genes in this yield enhancing pool have likely been extensively mined. A second gene pool apparently promotes yield when plants compete as a colony or collective in the field environment. This second pool of yield enhancing genes does not appear to date to have been extensively mined.

To commercially capture the significant genetic yield advances we have bread into our cereal grains, a modified hill plot design is needed. In an ideal embodiment, barley or some other cereal grain is planted in the hill plot design 10 in an approximately 1 foot by 1 foot grid design as illustrated by the W and the D of FIG. 1, representing width and depth from plant colony to plant colony in the drawings. This is an ideal density to maximize commercial yield. In the hill plot method, seeds are planted in seed planting sites that are in rows that run longitudinally 14 and transversally 16 and intersect at seed planting sites 12. In a further embodiment, between 3 and 30 seeds are planted in each seed planting location 12 in order to maximize yield. Hill plot derived barley varieties, grown in approximately a 1 foot by 1 foot grid design, were compared with an identical sized plot cut from an adjacent commercial field planted as single seeds in rows of seeds. Additionally, in a preferred embodiment wheat plants or barley plants are ideal, however, the method may be used with any cereal grain.

Two important findings emerged from the experiments. First, two years of data show that hill plot derived barleys grown in the hill plot environment will, in northern Idaho, out yield commercial production using best practices and highest yielding varieties by 20% to 25%. Second, one of the highest yielding barley varieties in northern Idaho is the hill plot derived variety Spaulding. When Spaulding was grown in a 1×1 hill plot design, its yield was 10% to 14% greater than if that variety were grown conventionally as individual plants in rows. These yield advances are achieved without the use of additional agricultural chemicals, including added fertilizer, or with the use of 'GMO' or molecular genetic plant breeding techniques. Hill plot derived varieties have quality, agronomic and disease reactions comparable to control varieties.

In the preceding description and in the FIGURE, like elements are identified with like reference numerals. The use of "e.g.," "etc," and "or" indicates non-exclusive alternatives without limitation unless otherwise noted. The use of "including" means "including, but not limited to," unless otherwise noted.

The exemplary embodiments shown in the FIGURE and described above illustrate but do not limit the invention. It should be understood that there is no intention to limit the invention to the specific form disclosed; rather, the invention is to cover all modifications, alternative constructions, and equivalents falling within the spirit and scope of the invention as defined in the claims. For example, while the exemplary embodiments illustrate wheat plants or barley plants growing in the hill plot seeding method, the invention is not limited to use with wheat plants growing in the hill plot seeding method and may be used with other cereal grains. While the invention is not limited to use with cereal grains, it is expected that various embodiments of the invention will be particularly useful in such devices. Hence, the foregoing description should not be construed to limit the scope of the invention, which is defined in the following claims.

What is claimed is:

1. A method of genetically selecting seeds of cereal grains for enhanced colony growth attributes and planting said seeds of cereal grains for enhanced commercial colony growth performance, wherein said method comprises the following steps in a cycle:
    planting a plurality of seeds of a cereal grain in a seed planting site within a series of seed planting sites, wherein said series of seed planting comprises a hill plot planting design, and repeating said step to plant a plurality of seeds in each of said seed planting sites within said series of seed planting sites until a desired number of seed planting sites have been seeded;
    growing said plurality of seeds into individual plants within a colony of plants;
    selecting said individual plants for one or more desired traits in said series of seed planting sites, wherein one of said desired traits in said series of seed planting sites further comprises enhanced colony growth attributes;
    selecting said plants exhibiting one or more of said desired traits in said series of seed planting sites within said hill plot planting designs to produce seeds that produce offspring having seeds exhibiting one or more of said desired traits;
    harvesting said seeds from said offspring; wherein said cycle of said method is performed at least one time to generate seeds having enhanced colony growth attributes, and
    wherein said seeds having said enhanced colony growth attributes are used in a commercial farming system wherein said seeds are planted in a hill plot planting system.

2. The method of genetically selecting seeds of cereal grains for enhanced colony growth attributes and planting said seeds of cereal grains for enhanced colony growth performance of claim 1, wherein said cereal grain further comprises barley.

3. The method of genetically selecting seeds of cereal grains for enhanced colony growth attributes and planting said seeds of cereal grains for enhanced colony growth performance of claim 1, wherein said cereal grain further comprises wheat.

4. The method of claim 1 of genetically selecting seeds of cereal grains for enhanced colony growth attributes and planting said seeds of cereal grains for enhanced colony growth performance, wherein said method further comprises harvesting seeds from said offspring exhibiting one or more of said desired traits; and using said seeds in a hill plot farming system.

5. The method of genetically selecting seeds of cereal grains for enhanced colony growth attributes and planting said seeds of cereal grains for enhanced colony growth performance of claim 1, wherein said method further comprises repeating said steps of said method for at least a total of two cycles.

6. The method of genetically selecting seeds of cereal grains for enhanced colony growth attributes and planting said seeds of cereal grains for enhanced colony growth performance of claim 1, wherein said method further comprises harvesting seeds from said plants of said colony following completion of selection cycles.

7. The method of genetically selecting seeds of cereal grains for enhanced colony growth attributes and planting said seeds of cereal grains for enhanced colony growth performance of claim 6, wherein:
    said method further comprises planting a plurality of said seeds from said plants of said colonies exhibiting said enhanced colony growth performance attributes; and
    wherein said seeds are planted in hill plot cultures for commercial cereal grain production.

8. The method of genetically selecting seeds of cereal grains for enhanced colony growth attributes and planting said seeds of cereal grains for enhanced colony growth performance of claim 7, wherein said plurality of said seeds comprises approximately from 3 to 30 seeds.

9. The method of genetically selecting seeds of cereal grains for enhanced colony growth attributes and planting said seeds of cereal grains for enhanced colony growth performance of claim 7, wherein said method further comprises planting said hill plot cultures in a plurality of longitudinal rows and a plurality of transverse rows, said plurality of transverse rows crossing said plurality of longitudinal rows.

10. The method of genetically selecting seeds of cereal grains for enhanced colony growth attributes and planting said seeds of cereal grains for enhanced colony growth performance of claim 9, wherein said plurality of said seeds comprises approximately from 3 to 30 seeds.

11. The method of genetically selecting seeds of cereal grains for enhanced colony growth attributes and planting said seeds of cereal grains for enhanced colony growth performance of claim 7, wherein said method further comprises planting said hill plot cultures in said plurality of transverse rows crossing said plurality of longitudinal rows, each of said hill plot cultures within said rows is planted approximately one foot away from any neighboring hill plot culture.

12. The method of genetically selecting seeds of cereal grains for enhanced colony growth attributes and planting said seeds of cereal grains for enhanced colony growth performance of claim 11, wherein said plurality of said seeds comprises approximately from 3 to 30 seeds.

13. A method of planting seeds of cereal grains for enhanced commercial yield, said method for planting seeds of cereal grains comprising:
    planting a plurality of seeds into a seed bed within a series of seed beds on a hill plot, wherein a plurality of seeds is planted into each seed bed, wherein said seeds planted into each of said seed beds grow into a colony of cereal grain plants, wherein said seeds of said method of planting seeds of cereal grains comprise seeds of plants that have been selected for enhanced colony growth attributes, wherein said seeds are planted in a commercial cereal grain production process, wherein said commercial grain production process comprises planting said seeds in a hill plot planting system.

14. The method of planting seeds of cereal grains for enhanced commercial yield of claim 13 wherein said plurality of seeds of said method of planting seeds of cereal grains comprises approximately from 3 to 30 seeds.

15. The method of planting seeds of cereal grains for enhanced commercial yield of claim 13 wherein said series of seed beds of said method of planting seeds of cereal grains further comprises a plurality of longitudinal seed beds and a plurality of transverse rows of seed beds, said plurality of transverse rows of seed beds crossing said plurality of longitudinal rows of seed beds.

16. The method of planting seeds of cereal grains for enhanced commercial yield of claim 15 wherein said plurality of seeds of said method of planting seeds of cereal grains comprises approximately 3 to 30 seeds.

17. A method of commercially growing cereal grains, wherein said method comprises the following steps:
  planting a plurality of seeds of a cereal grain in a seed planting site within a series of seed planting sites and repeating said step to plant a plurality of seeds in each of said seed planting sites within said series of seed planting sites until a desired number of seed planting sites have been seeded;
  growing said seeds into a plurality of plants;
  selecting said individual plants for one or more desired traits in said series of seed planting sites, wherein one of said desired traits in said series of seed planting sites further comprises enhanced colony growth attributes;
  selecting said plants exhibiting one or more of said desired traits in said series of seed planting sites within said hill plot planting designs to produce seeds that produce offspring having seeds exhibiting one or more of said desired traits;
  harvesting said seeds from said offspring, wherein said process is performed at least one time to produce the selected seeds; planting said selected seeds in a commercial cereal grain production process, wherein said
  commercial cereal grain production process comprises planting said seeds in a hill
  plot planting system; and harvesting plants grown from said selected seeds in said commercial cereal grain
  production process.

* * * * *